United States Patent
Chen et al.

(10) Patent No.: US 7,872,816 B2
(45) Date of Patent: Jan. 18, 2011

(54) TURNING MECHANISM

(75) Inventors: Chia-Tien Chen, Hsin-Chu (TW); Hung-Lin Lee, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 251 days.

(21) Appl. No.: 12/192,135

(22) Filed: Aug. 15, 2008

(65) Prior Publication Data

US 2009/0244722 A1  Oct. 1, 2009

(30) Foreign Application Priority Data

Mar. 31, 2008  (TW) ............................... 97205501 U

(51) Int. Cl.
*G02B 7/02* (2006.01)
(52) U.S. Cl. ...................... 359/819; 359/703; 359/822; 359/823
(58) Field of Classification Search .................. 359/819
See application file for complete search history.

(56) References Cited

U.S. PATENT DOCUMENTS 6,117,071 A * 9/2000 Ito et al. ..................... 600/168
7,019,916 B2 * 3/2006 Suzuki ....................... 359/699
2006/0092384 A1 * 5/2006 Kuroda ....................... 353/69
2007/0064205 A1 * 3/2007 Meng et al. ................. 353/101

FOREIGN PATENT DOCUMENTS

TW  200712735  4/2007

* cited by examiner

*Primary Examiner*—Jessica T Stultz
(74) *Attorney, Agent, or Firm*—Jianq Chyun IP Office

(57) ABSTRACT

A turning mechanism is adapted to a projector including a base and a zoom lens set in a base for turning a zoom bar of the zoom lens. The turning mechanism includes a fixed element and a movable element. The fixed element is suitable to be fastened to the base and has a pair of slide tracks. The movable element has a pair of slide edges, a pair of slide hooks, and a turn portion. The slide hooks lock the slide tracks respectively, and the slide edges are supported by the slide tracks respectively. Therefore, the movable element substantially slides around a light axis of the zoom lens relative to the fixed element, so as to move the turn portion to turn the zoom bar.

11 Claims, 5 Drawing Sheets

TURNING MECHANISM

CROSS-REFERENCE TO RELATED APPLICATION

This application claims the priority benefit of Taiwan application serial no. 97205501, filed on Mar. 31, 2008. The entirety of the above-mentioned patent application is hereby incorporated by reference herein and made a part of specification.

BACKGROUND OF THE INVENTION

1. Field of the Invention

The present invention generally relates to a turning mechanism, and in particular, to a turning mechanism adapted to a projector for turning a zoom bar of a zoom lens.

2. Description of Related Art

Current projectors project images with high definition and high brightness. Due to reduced price and small volume of the projectors, the projectors have been widely used by public. However, the size of the projected screens and the distance between the projected screen and the projector are always limited by the space of environment. Therefore, the projectors are generally equipped with zoom lenses for adjusting the size and resolution of the projected images.

In order to enable a user to manually adjust a zoom bar of the zoom lens, a zoom ring is slidably disposed around a light axis of the zoom lens on a base that accommodates the zoom lens, and is movably connected to an end of the zoom bar. Further, a stopper is mounted to the base to directly define a range of the zoom ring moving around the light axis, thereby indirectly defining a switching range of the zoom bar. Therefore, the user may switch the zoom bar by manually turning the zoom ring, thereby adjusting the focal length of the zoom lens.

However, in the prior art, the stopper cannot be fastened to the base to slidably dispose the zoom ring on the base only unless the zoom ring, the zoom bar, and the stopper are aligned at the same time, which will increase the difficulty in assembly. Moreover, the base is generally made of Al—Mg alloy, and thus when the zoom ring is slidably disposed on the base, the friction between the plastic zoom ring and the surface of the base will produce unpleasant noises.

SUMMARY OF THE INVENTION

Accordingly, the present invention is directed to a turning mechanism applicable to a projector for turning a zoom bar of a zoom lens.

An embodiment of the present invention provides a turning mechanism, adapted to a projector including a base and a zoom lens set in base, for turning a zoom bar of the zoom lens. The turning mechanism includes a fixed element and a movable element. The fixed element is suitable to be fastened to the base, and has a pair of slide tracks. The movable element has a pair of slide edges, a pair of slide hooks, and a turn portion. The pair of slide hooks lock the pair of slide tracks respectively, and the pair of slide edges are supported by the pair of slide tracks respectively, such that the movable element substantially slides around a light axis of the zoom lens relative to the fixed element, so as to move the turn portion to turn the zoom bar.

In the above embodiment of the present invention, the pair of slide hooks of the movable element lock the pair of slide tracks of the fixed element respectively. The pair of slide edges of the movable element are supported by the pair of slide tracks of the fixed element respectively. Thus, the movable element slides around the light axis of the zoom axis relative to the fixed element, so as to move the turn portion of the movable element to turn the zoom bar.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
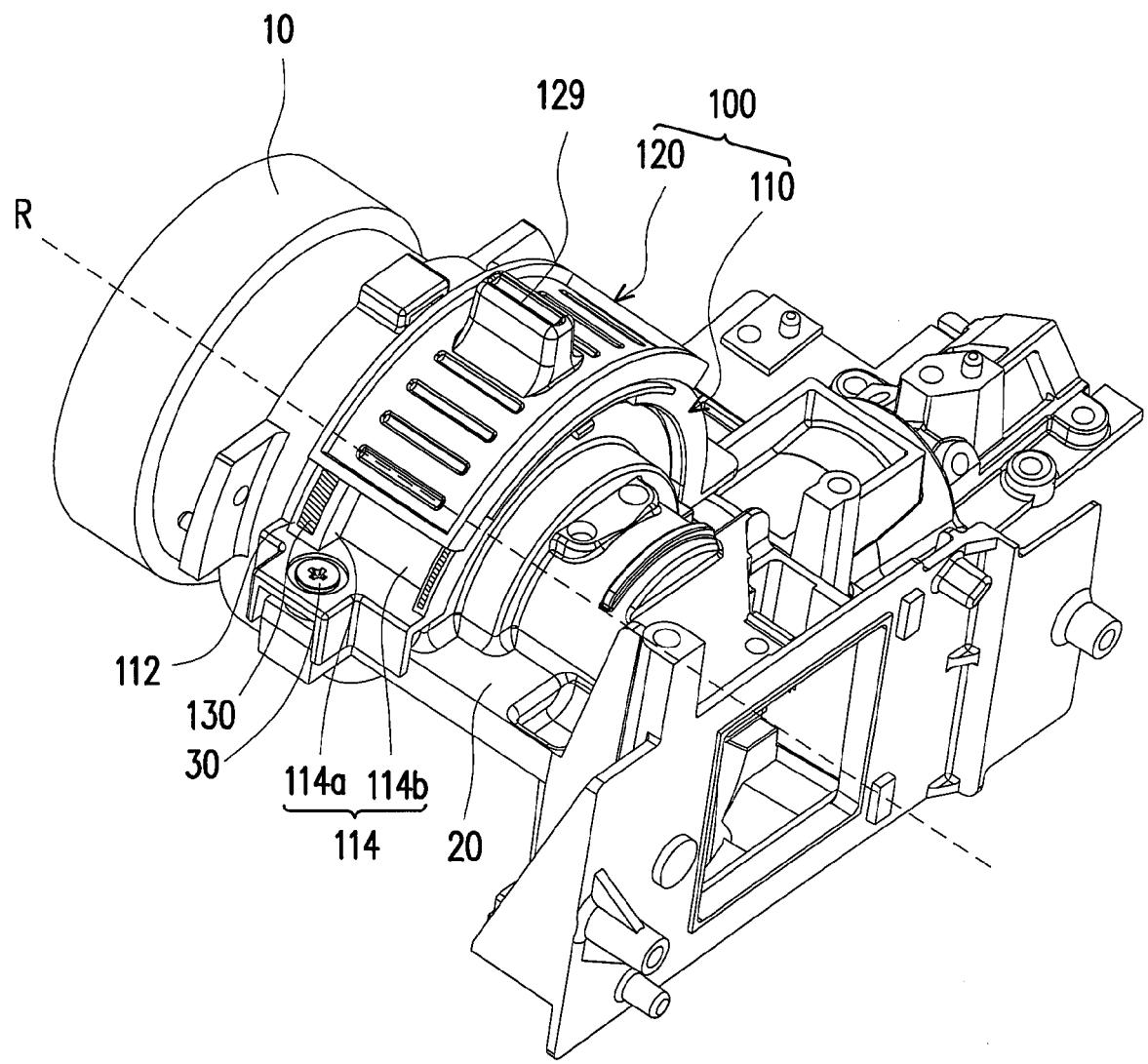
FIG. 1 is a perspective view of a turning mechanism set in a base with a zoom lens according to an embodiment of the present invention.
Figure 2:
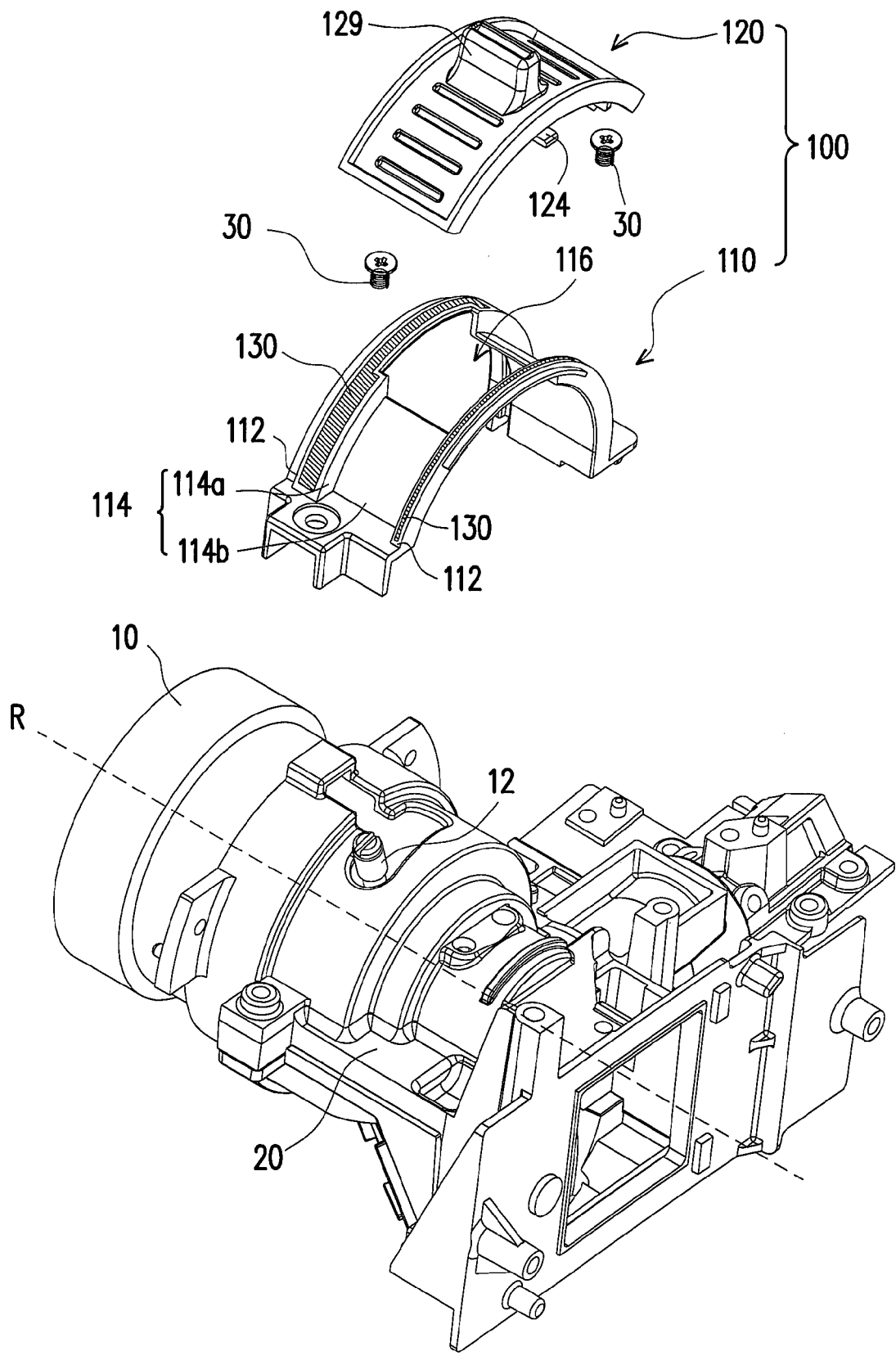
FIG. 2 is an exploded perspective view of the turning mechanism and the base with the zoom lens of FIG. 1.

FIG. 1 is a perspective view of a turning mechanism set in a base with a zoom lens according to an embodiment of the present invention. FIG. 2 is an exploded perspective view of the turning mechanism and the base with the zoom lens of FIG. 1. Referring to FIGS. 1 and 2, in this embodiment, the turning mechanism 100 is adapted to a projector having a base 20 and a zoom lens 10 set on the base 20, and the turning mechanism 100 is used for turning a zoom bar 12 of the zoom lens 10.

The turning mechanism 100 includes a fixed element 110 and a movable element 120. The fixed element 110 is suitable to be fastened to the base 20 by, for example, screws 30. The fixed element 110 has a pair of slide tracks 112 and an opening 116. The movable element 120 has a pair of slide edges 122, a pair of slide hooks 124, and a turn portion 126 shown in FIG. 3.

Figure 3:
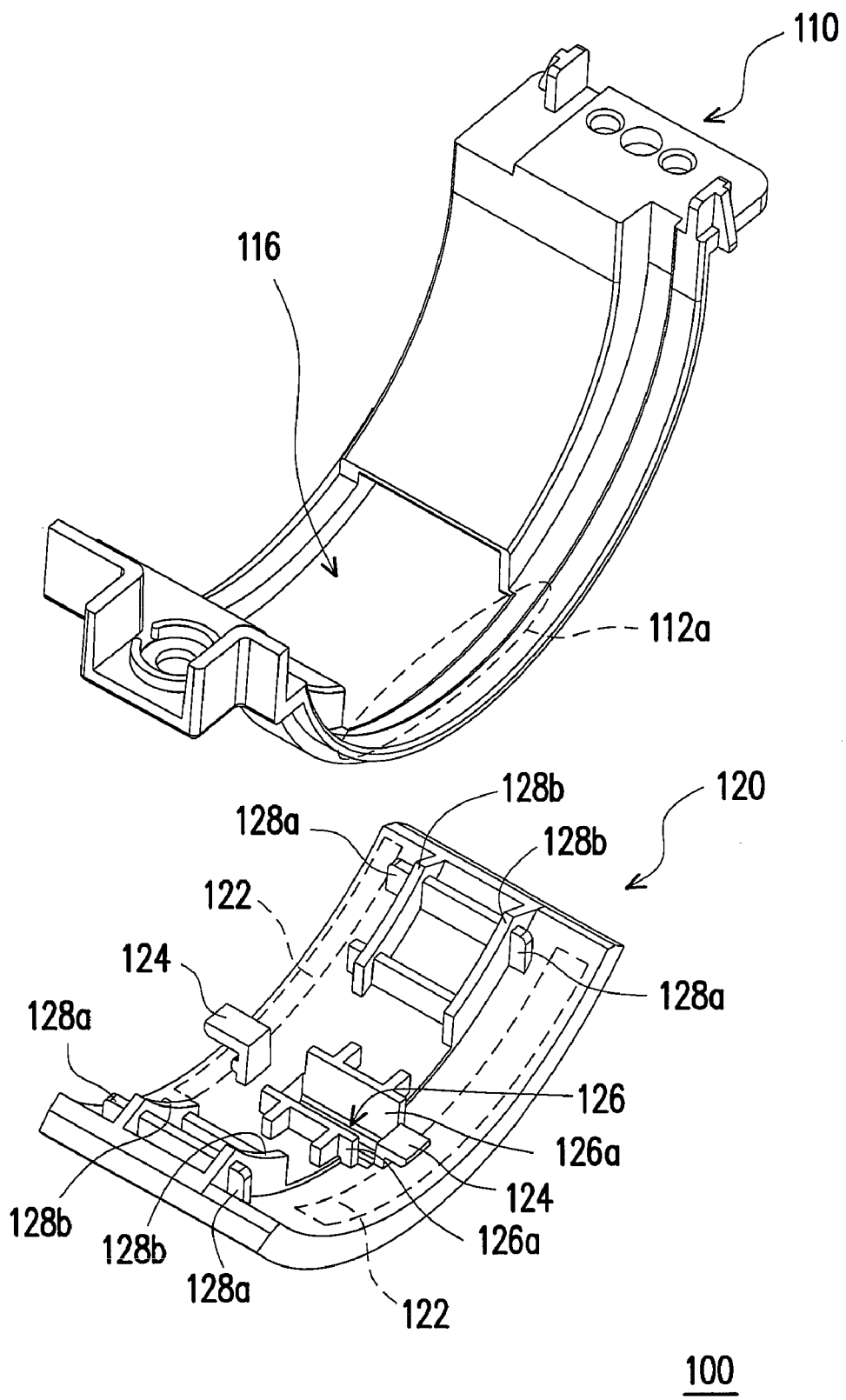
FIG. 3 is an exploded perspective view of the turning mechanism of FIG. 2 taken from another view point.
Figure 4:
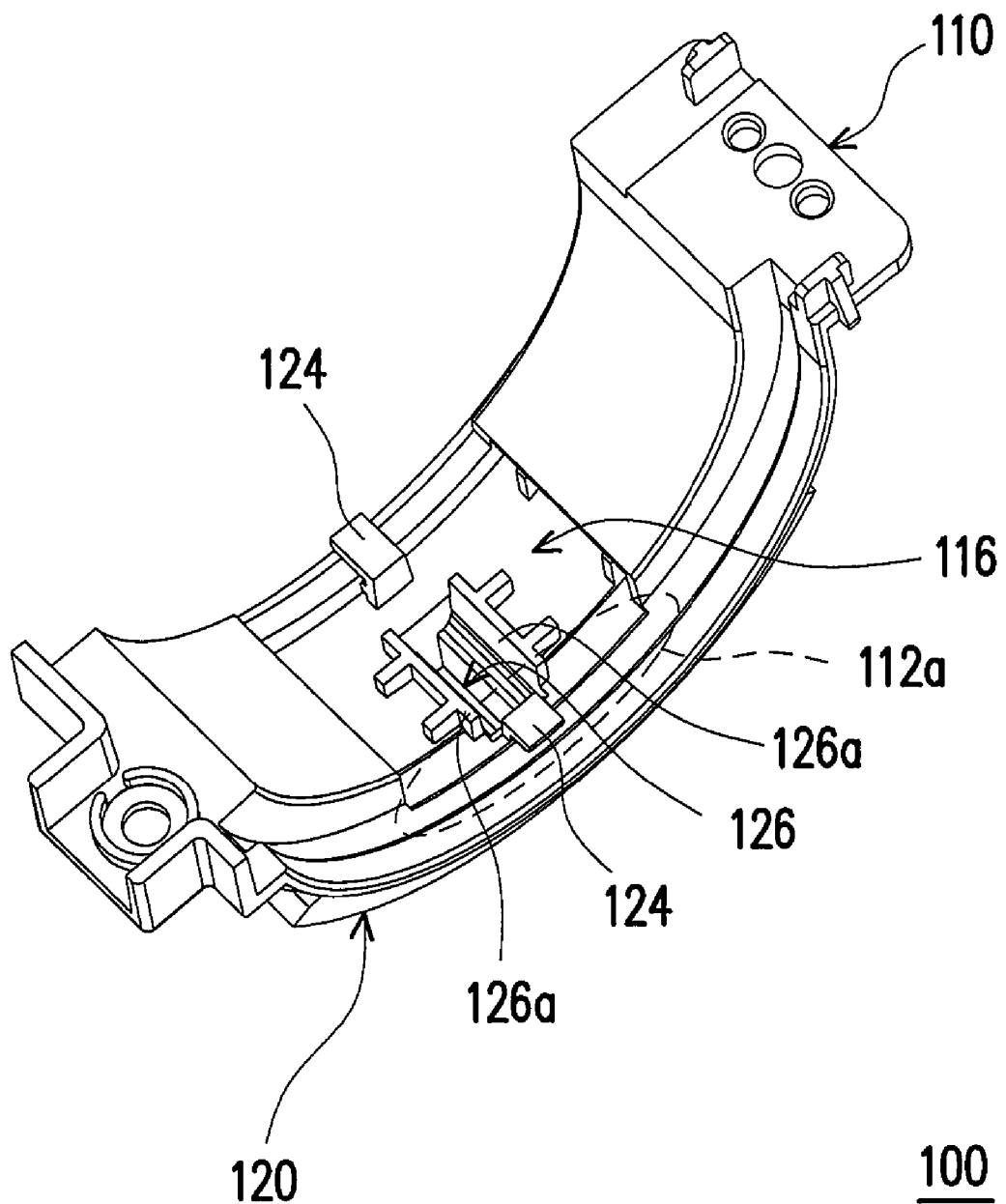
FIG. 4 is a perspective view of the turning mechanism of FIG. 3 after assembly.

FIG. 3 is an exploded perspective view of the turning mechanism of FIG. 2 taken from another view point. FIG. 4 is a perspective view of the turning mechanism of FIG. 3 after assembly. Referring to FIGS. 2, 3, and 4, one of the pair of slide tracks 112 of this embodiment has a stopper portion 112a for limiting a sliding range of the one of the pair of slide hooks 124 relative to the stopper portion 112a. The turn portion 126 passes through the opening 116 of the fixed element 110, so as to turn the zoom bar 12. The turn portion 126 includes a pair of turning pieces 126a, and the zoom bar 12 is turned by one of the pair of turning pieces 126a.

In this embodiment, portions of the pair of slide tracks 112 respectively locked by the pair of slide hooks 124 are of different thicknesses, and this fool-proof design reduces the probability of manually assembling the movable element 120 and the fixed element 110 in a wrong direction. Moreover, the movable element 120 has a force applying portion 129 protruding from the movable element 120, such that the user may apply a force on the force applying portion 129, so as to move the turning pieces 126a of the turn portion 126 to turn the zoom bar 12, thereby facilitating the user to adjust the focal length of the zoom lens 10.

Further, in this embodiment, the turning mechanism 100 further includes a smooth layer 130, which is made of, for example, polytetrafluoroethylene (PTFE). The smooth layer 130 is disposed on the pair of slide tracks 112, and located between the pair of slide tracks 112 and the pair of slide edges 122 respectively (see FIG. 1), for reducing the friction force between the movable element 120 and the fixed element 110. In another embodiment not shown, the smooth layer 130 may also be disposed on the pair of slide edges 122, and located between the pair of slide tracks 112 and the pair of slide edges 122 respectively.

Figure 5:
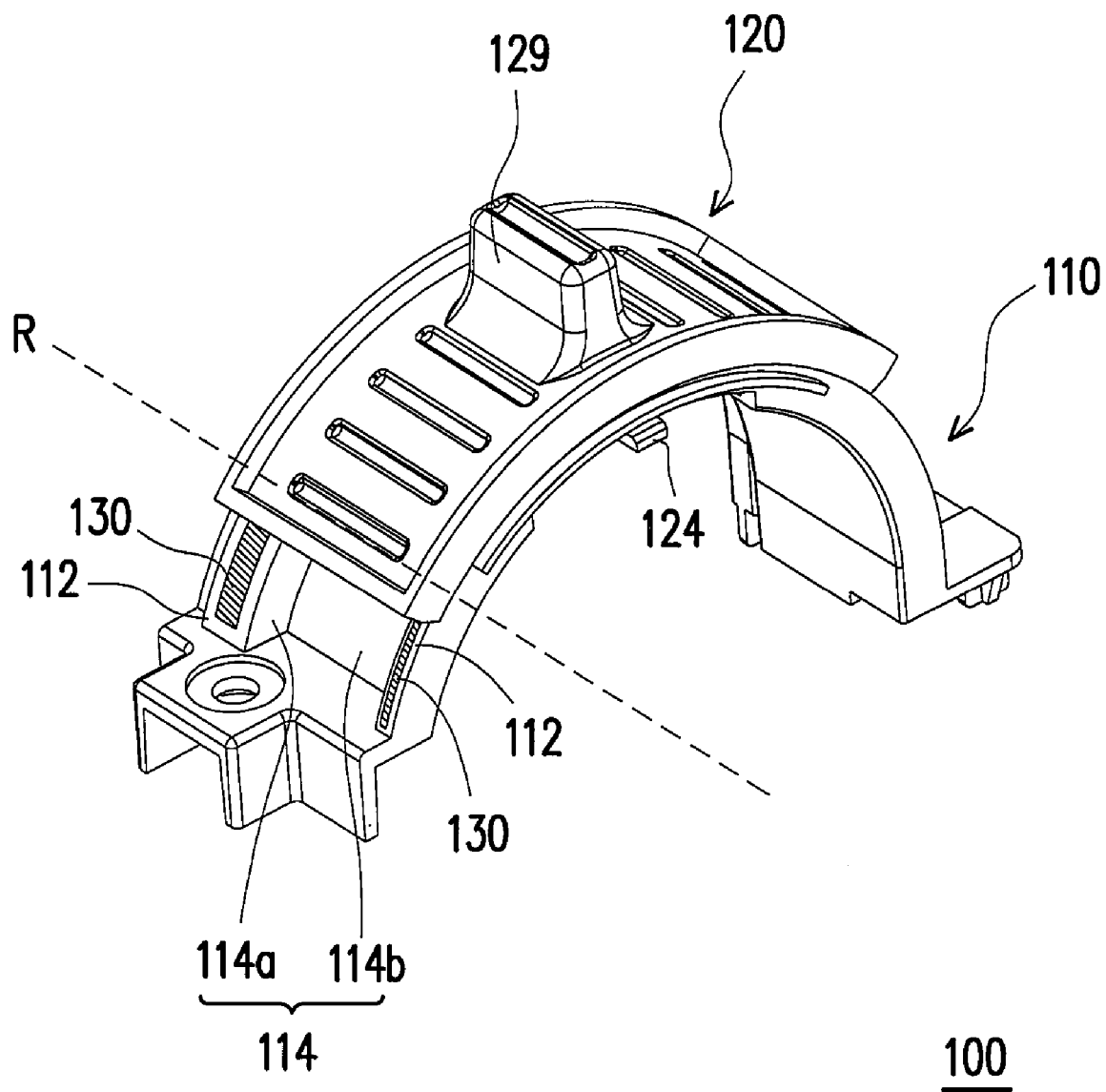
FIG. 5 is a perspective view of the turning mechanism of FIG. 4 taken from another view point.

FIG. 5 is a perspective view of the turning mechanism of FIG. 4 taken from another view point. Referring to FIGS. 2, 3, and 5, the fixed element 110 of this embodiment has a guide slot 114, and the movable element 120 has two pairs of side guide blocks 128a. The two pairs of side guide blocks 128a are respectively located at two sides of the turn portion 126, and adapted to slide on two opposite inner sides 114a of the guide slot 114. In detail, the two pairs of side guide blocks 128a are respectively in point-contact with the inner sides 114a of the guide slot 114, for preventing the movable element 120 rotating in a horizontal direction when sliding on the fixed element 110, thus avoiding the movable element 120 swinging relative to the fixed element 110, and increasing the stability of the movable element 120 when sliding on the fixed element 110.

Moreover, the guide slot 114 has two opposite inner sides 114a and an inner bottom 114b, the fixed element 110 has a guide slot 114, and the movable element 120 has at least one pair of bottom guide blocks 128b (FIG. 3 shows two pairs of bottom guide blocks). The two pairs of bottom guide blocks 128b are respectively located at two sides of the turn portion 126, and adapted to slide on the inner bottom 114b of the guide slot 114. In detail, the two pairs of bottom guide blocks 128b are in line-contact with the inner bottom 114b, for enhancing the structural strength of the turning mechanism 100.

Further, in this embodiment, the movable element 120 and the fixed element 110 are both made of plastic. Therefore, when the movable element 120 is locked to the fixed element 110 and slides relative to the fixed element 110, the noise of friction is reduced, thus reducing the generation of unpleasant noises.

The operations of assembling the turning mechanism 100 are illustrated herein below. Referring to FIGS. 2, 3, 4, and 5, in brief, the slide hooks 124 of the movable element 120 lock the slide tracks 112 of the fixed element 110 respectively. The slide edges 122 of the movable element 120 are supported by the slide tracks 112 of the fixed element 110 respectively. Thus, the movable element 120 slides around a light axis R of the zoom lens 10 relative to the fixed element 110, so as to move the turn portion 126 to turn the zoom bar 12.

In detail, referring to FIGS. 3, 4, and 5, when the slide hooks 124 of the movable element 120 lock the slide tracks 112 of the fixed element 110 respectively, and the slide edges 122 of the movable element 120 are supported by the slide tracks 112 of the fixed element 110 respectively, the two pairs of side guide blocks 128a located at two sides of the turn portion 126 slide on the two opposite inner sides 114a of the guide slot 114 in a point-contact manner, so as to avoid the movable element 120 swinging on the fixed element 110. Thus, the stability of the movable element 120 when sliding on the fixed element 110 is increased.

Referring to FIGS. 2, 4, and 5, before assembling the turning mechanism 100 on the base 20, the zoom bar 12 and the turn portion 126 must be aligned to correctly assemble the fixed element 110 to the base 20. After assembling the fixed element 110 to the base 20, the movable element 120 substantially slides around the light axis R of the zoom lens 10 relative to the fixed element 110, so as to move the turn portion 126 to turn the zoom bar 12. Therefore, the movable element 120 sliding on the fixed element 110 turns the zoom bar 12, so as to adjust the focal length of the zoom lens 10.

In the turning mechanism of the above embodiment, the pair of slide hooks of the movable element lock the pair of slide tracks of the fixed element respectively. The pair of slide edges of the movable element are supported by the slide tracks of the fixed element respectively. Thus, the movable element slides around the light axis of the zoom lens relative to the fixed element, so as to move the turn portion of the movable element to turn the zoom bar.

Moreover, in the turning mechanism of the above embodiments, the movable element and the fixed element may be first assembled, and then the fixed element is fixed to the base. At the same time, the turn portion of the movable element is aligned with the zoom bar of the zoom lens. Compared with the prior art that the zoom ring cannot be fixed on the base correctly unless the zoom ring, the zoom bar, and the stopper are aligned, the above embodiment increases the convenience of assembling the turning mechanism.

Further, in the turning mechanism of the above embodiment, the movable element and the fixed element are assembled by locking, and the guide blocks and guide slots are used to reduce the swinging of the movable element relative to the fixed element. Therefore, the turning mechanism of the above embodiment of the present invention has better convenience in assembling, and has better stability in operation.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A turning mechanism, adapted to a projector comprising a base and a zoom lens set in the base, for turning a zoom bar of the zoom lens, the turning mechanism comprising:
    a fixed element, suitable to be fastened to the base, and comprising a pair of slide tracks; and
    a movable element, comprising a pair of slide edges, a pair of slide hooks, and a turn portion, wherein the turn portion comprises a pair of turning pieces, the zoom bar is turned by one of the pair of turning pieces, and the turning pieces are disposed at two opposite sides of the zoom bar,
    wherein the pair of slide hooks lock the pair of slide tracks respectively, the pair of slide edges are supported by the pair of slide tracks respectively, such that the movable element substantially slides around a light axis of the zoom lens relative to the fixed element, so as to move the turn portion to turn the zoom bar.

2. The turning mechanism according to claim 1, wherein the fixed element comprises a guide slot, and the movable element comprises two pairs of side guide blocks disposed at two sides of the turn portion and adapted to slide on two opposite inner sides of the guide slot respectively.

3. The turning mechanism according to claim 2, wherein the pairs of side guide blocks are in point-contact with the inner sides of the guide slot respectively.

4. The turning mechanism according to claim 1, wherein the fixed element comprises a guide slot, the guide slot comprises two opposite inner sides and an inner bottom, and the movable element comprises at least one pair of bottom guide blocks disposed at two sides of the turn portion and adapted to slide on the inner bottom of the guide slot respectively.

5. The turning mechanism according to claim 4, wherein the pair of bottom guide blocks are in line-contact with the inner bottom.

6. The turning mechanism according to claim 1, wherein one of the pair of slide tracks comprises a stopper portion for limiting a sliding range of the slide hooks corresponding to the stopper portion.

7. The turning mechanism according to claim 1, wherein the fixed element comprises an opening and the turn portion passes through the opening to turn the zoom bar.

8. The turning mechanism according to claim 1, wherein portions of the pair of slide tracks respectively locked by the pair of slide hooks are of different thicknesses.

9. The turning mechanism according to claim 1, wherein the movable element comprises a force applying portion protruding from the movable element.

10. The turning mechanism according to claim 1, further comprising:
    a smooth layer, disposed on the pair of slide tracks or the pair of slide edges.

11. The turning mechanism according to claim 10, wherein the smooth layer is made of polytetrafluoroethylene.

* * * * *